United States Patent
Volz et al.

(10) Patent No.: US 6,189,983 B1
(45) Date of Patent: Feb. 20, 2001

(54) ELECTROMAGNETIC VALVE WITH PRESSURE LIMITING FUNCTION, ESPECIALLY FOR MOTOR VEHICLE HYDRAULIC BRAKING SYSTEMS WITH ANTI-SLIP CONTROL AND/OR AUTOMATIC BRAKE ENGAGEMENT FOR CONTROL OF DRIVE DYNAMICS

(75) Inventors: Peter Volz, Darmstadt; Hans-Dieter Reinartz, Frankfurt am Main; Dieter Dinkel, Eppstein/Ts., all of (DE)

(73) Assignee: ITT Manufacturing Enterprises, Inc., Wilmington, DE (US)

( * ) Notice: Under 35 U.S.C. 154(b), the term of this patent shall be extended for 0 days.

(21) Appl. No.: 08/875,910

(22) PCT Filed: Feb. 6, 1996

(86) PCT No.: PCT/EP96/00486

§ 371 Date: Nov. 17, 1997

§ 102(e) Date: Nov. 17, 1997

(30) Foreign Application Priority Data

Feb. 4, 1996 (DE) ............................... 195 04 246

(51) Int. Cl.$^7$ ........................................................ B60T 8/36
(52) U.S. Cl. ..................................... 303/119.2; 137/596.17
(58) Field of Search ............................ 303/119.2, 119.3; 137/596.17, 596.21

(56) References Cited

U.S. PATENT DOCUMENTS

| | | | |
|---|---|---|---|
| 3,719,401 | * | 3/1973 | Peruglia ............................. 303/119.2 |
| 4,548,233 | * | 10/1985 | Wölfges . |
| 4,858,956 | * | 8/1989 | Taxon . |
| 5,388,899 | * | 2/1995 | Volz et al. ......................... 303/119.2 |
| 5,503,184 | * | 4/1996 | Reinarts et al. ................... 303/119.2 |
| 5,511,864 | * | 4/1996 | Reinartz et al. .................. 303/119.2 |
| 5,860,709 | * | 1/1999 | Hosoya .............................. 303/119.2 |

FOREIGN PATENT DOCUMENTS

| | | | |
|---|---|---|---|
| 21065 | * | 5/1961 | (DE) . |
| 2315425 | * | 10/1974 | (DE) . |
| 3534665 | * | 4/1987 | (DE) . |
| 4102626 | * | 8/1992 | (DE) . |
| 4103365 | * | 8/1992 | (DE) . |
| 4137123 | * | 5/1993 | (DE) . |
| 4141546 | * | 6/1993 | (DE) . |
| 4204417 | * | 8/1993 | (DE) . |
| 4234749 | * | 4/1994 | (DE) . |
| 4236505 | * | 5/1994 | (DE) . |
| 0492109 | * | 7/1992 | (EP) . |
| 761703 | * | 11/1956 | (GB) . |
| 92/13741 | * | 8/1992 | (WO) . |

* cited by examiner

Primary Examiner—Matthew C. Graham
(74) Attorney, Agent, or Firm—Rader, Fishman & Grauer PLLC

(57) ABSTRACT

A hydraulic brake system includes a solenoid valve with a pressure-limiting function to such effect that a stroke movement of a valve tappet, which can be fulfilled in response to the electromagnetic control force, is variable by the action of a hydraulic control force. A first pressure fluid channel is connected to the hydraulic pressure generator and opens into the valve housing proximate the valve tappet, and a second pressure fluid channel opens into the valve housing remote from the valve seat and the valve tappet. The second pressure fluid channel is connected to a pump and at least one wheel brake and is connectable to the first pressure fluid channel depending on the position of the tappet. The hydraulic pressure of the braking pressure generator acts upon an actuating member which counteracts the closing movement of the valve tappet.

14 Claims, 2 Drawing Sheets

ELECTROMAGNETIC VALVE WITH PRESSURE LIMITING FUNCTION, ESPECIALLY FOR MOTOR VEHICLE HYDRAULIC BRAKING SYSTEMS WITH ANTI-SLIP CONTROL AND/OR AUTOMATIC BRAKE ENGAGEMENT FOR CONTROL OF DRIVE DYNAMICS

BACKGROUND OF THE INVENTION

The present invention relates to a solenoid valve with a pressure-limiting functionand to a hydraulic automotive vehicle brake system with automatic brake management comprising such a valve.

German patent application No. 42 04 417 discloses a solenoid valve with a pressure-limiting function of the generic type. The prior art solenoid valve combines functions relating to the control of pressure fluid between the braking pressure generator and the wheel brake and the limitation of the system pressure in the sense of a hydraulically operable pressure-limiting valve during traction slip control. When the system pressure or the maximum pressure is increased by the respectively prevailing pressure of the braking pressure generator, the pressure-limiting function of the valve, which is configured to have a defined switching point, can no longer be performed accurately. This problem is particularly significant when a solenoid valve of this type is used for brake systems intended to perform automatic brake management for driving dynamics control.

SUMMARY OF THE INVENTION

Therefore, an object of the present invention is to prevent the pressure of the braking pressure generator, which is applied to the solenoid valve, from influencing the switching behavior (pressure limitation) of the solenoid valve.

According to the present invention, this object is achieved by the characterizing features of the independent patent claim 1 and, alternatively, by the features of patent claim 10.

Thus, in the first case, the present invention is based on the idea of applying the pressure of the braking pressure generator to either side of the valve tappet so that the pressure of the braking pressure generator is balanced in all operating conditions. In the second case, the present invention discloses sealing the valve needle in the magnetic core so that the end surfaces of the valve tappet are free from the pressure effect of the braking pressure generator during the pressure-limiting function.

Further features, advantages and possible applications of the present invention can be taken from the following description of two embodiments making reference to the accompanying drawings.

DETAILED DESCRIPTION OF THE DRAWINGS

Figure 1:
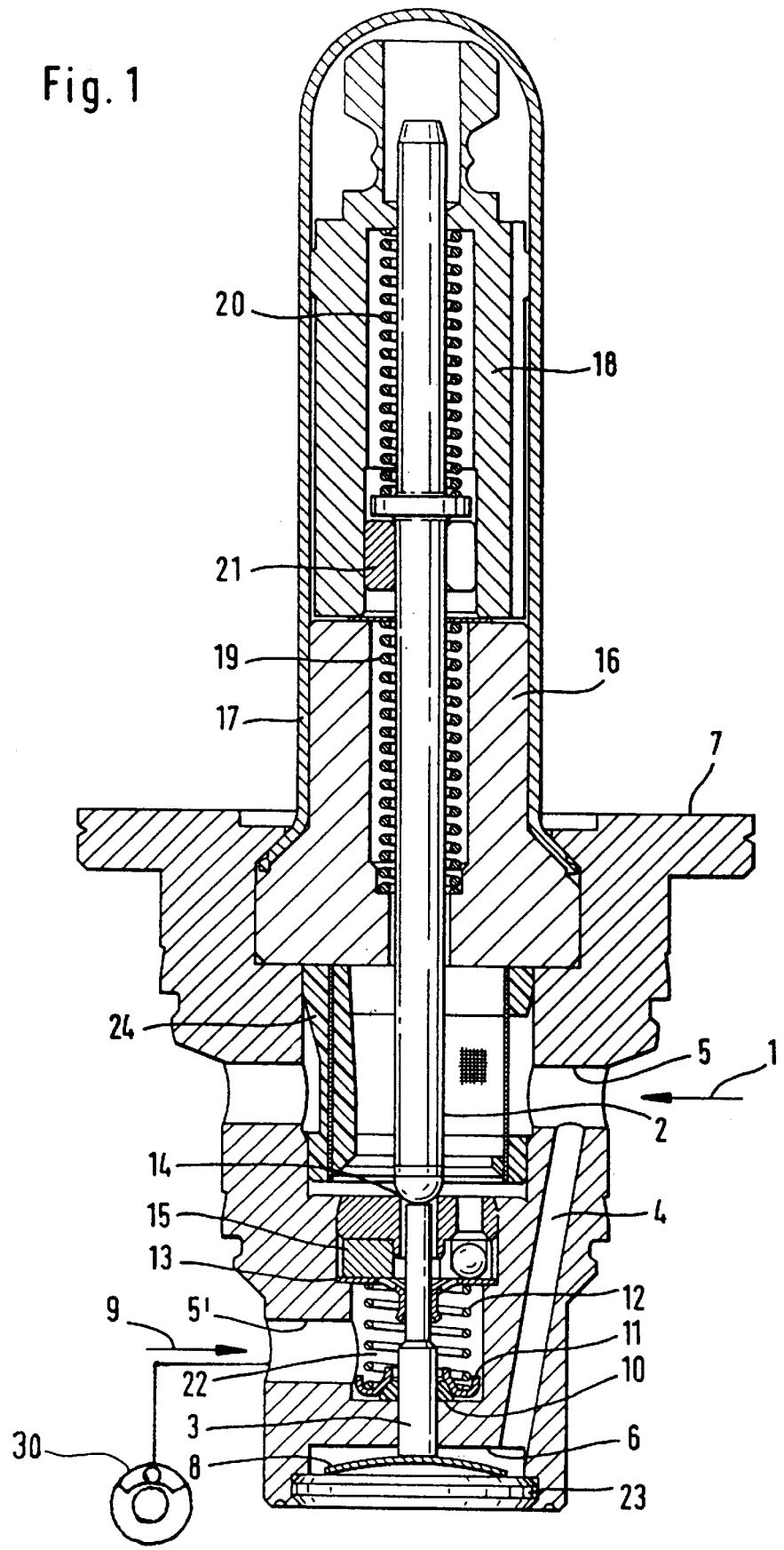
FIG. 1 is a cross-sectional view of a solenoid valve in the closed valve switching position.

In the embodiment shown in FIG. 1, the magnetic core 16, along with the relatively thin-walled, deepdrawn valve sleeve 17, is calked in the valve housing 7. Valve sleeve 17 accommodates a magnetic coil which is not shown. A resetting spring 19 which is compressed between the magnetic core 16 and the magnetic armature 18 causes the valve tappet 2 to lift from the valve seat 14 in the electromagnetically non-energized initial position. A pressure-limiting spring 20, which is arranged in a coaxial stepped bore of the magnetic armature 18, keeps the valve tappet 2 on a stop 21 in the magnetic armature 18 in the initial position of the valve. Interposed between the end surface of the magnetic armature 18 and the magnetic core 16 is a non-ferromagnetic disc which prevents the magnetic armature 18 from getting stuck on the magnetic core 16 during the electromagnetic actuation. This shortcoming is undesirable and well known in the art. The valve housing 7 is made of free-cutting steel in a cartridge-type construction. Depending on the housing steps, the housing 7 can be retained in a light-metal valve accommodating member in operative and/or positive engagement. The first pressure fluid channel 5, which opens radially on either side into the valve housing 7 at the level of the valve tappet 2, is connected to the braking pressure generator 1. A second pressure fluid channel 5' opens into the valve housing 7 downstream of the valve seat 14. At the level of the point where the second pressure fluid channel 5' opens into the valve housing 7, there is an actuating member 3 which is aligned coaxially relative to the valve seat 14 and the valve tappet 2. Actuating member 3 is in abutment on the end surface of the valve tappet 2 in the area of the valve seat 14 by the action of a compression spring 8, in opposition to the closing movement of the solenoid valve. A pressure chamber 6 accommodating the compression spring 8 is arranged in the valve housing 7 below the second pressure fluid channel 5'. The pressure chamber 6 is exposed to the effect of the pressure of the braking pressure generator 1 by way of a pressure fluid branch line 4 at the first pressure fluid channel 5. The pressure chamber 6 is sealed in relation to the pump pressure chamber 22, connected to a pump 9 via the second pressure fluid channel 5', by way of an annular seal 10 on the tappet-shaped stem of the actuating member 3. Annular seal 10 is fixed in position in the pump pressure chamber 22 by way of a supporting disc 11. The necessary press-on force is produced by a spring 12 which is supported on a centering disc 13 with its winding end remote from the supporting disc 11. Disc 13 is used to guide the actuating member 3 and has apertures which permit a connection between the second pressure fluid channel 5' and the first pressure fluid channel 5 in the valve housing 7. Interposed between the valve seat 14 and the supporting disc 11 is a non-return valve 15 which, if necessary, ensures a pressure fluid connection between the braking pressure generator 1 and the second pressure fluid channel 5'. Connected to channel 5' is also the main pressure line that leads to the wheel brake 30. The compression spring 8, the actuating member 3, the annular seal 10, the supporting disc 11, the spring 12, the non-return valve 15, the valve seat 14 and the valve tappet 2 are in coaxial relationship. Because the compression spring 8 is configured as a cup spring, the pressure chamber 6 has a particularly small size which increases the overall length of the construction known from the art only to a small extent. Due to the cartridge-type construction, a cover 23 is sealed and calked in the valve housing 7 to close the pressure chamber 6. To keep the valve seat 14 clean, annular filter elements are provided, preferably proximate both pressure fluid channels 5, 5'. As shown in the drawing, the annular filter element 24 of the first pressure fluid channel 5 is retained in a space-saving manner within the hollow space which extends between the magnetic core 16 and the valve seat 14.

The operation of the disclosed solenoid valve will be described hereinbelow. The electromagnetic energization of the magnetic armature 18 causes the valve tappet 2 to move into abutment on the valve seat 14, in opposition to the relatively weak effect of the resetting spring 19 in the magnetic core 16. Preferably, the valve tappet 2 lifts by a small stroke from the stop 21 in the magnetic armature 18 so that the pressure fluid connection between the first and the second pressure fluid channels 5, 5' is reliably closed upon electromagnetic actuation of the valve, even upon the occurrence of wear between the valve tappet 2 and the valve seat 14. When the solenoid valve is in its closed position, the valve tappet 2 will move into contact with the spring-loaded actuating member 3. An annular slot remains between the opening in the valve seat 14 and the stem of the actuating member 3. Pressure from the pump 9 via the pressure fluid channel 5' propagates into the annular slot and acts upon the annular end surface of the valve tappet 2 when the latter is in its closed position. Variation of the pressure in the braking pressure generator 1 causes the same amount of hydraulic pressure to prevail both downstream of the actuating member 3 and upstream of the valve tappet 2. Due to its opposed effect at corresponding end surfaces of the actuating member 3 and the valve tappet 2, the hydraulic pressure causes pressure balance of the actuating pressure applied by the braking pressure generator 1. The result is that the pressure-limiting spring 20, interposed between the valve tappet 2 and the magnetic armature 18, must be rated exclusively in conformity with the allowable pump pressure. In contrast thereto, the pressure force of the compression spring 8 arranged on the actuating member 3 is exclusively directed to the compensation of the force which is exerted by the pump pressure on the actuating member 3.

Figure 2:
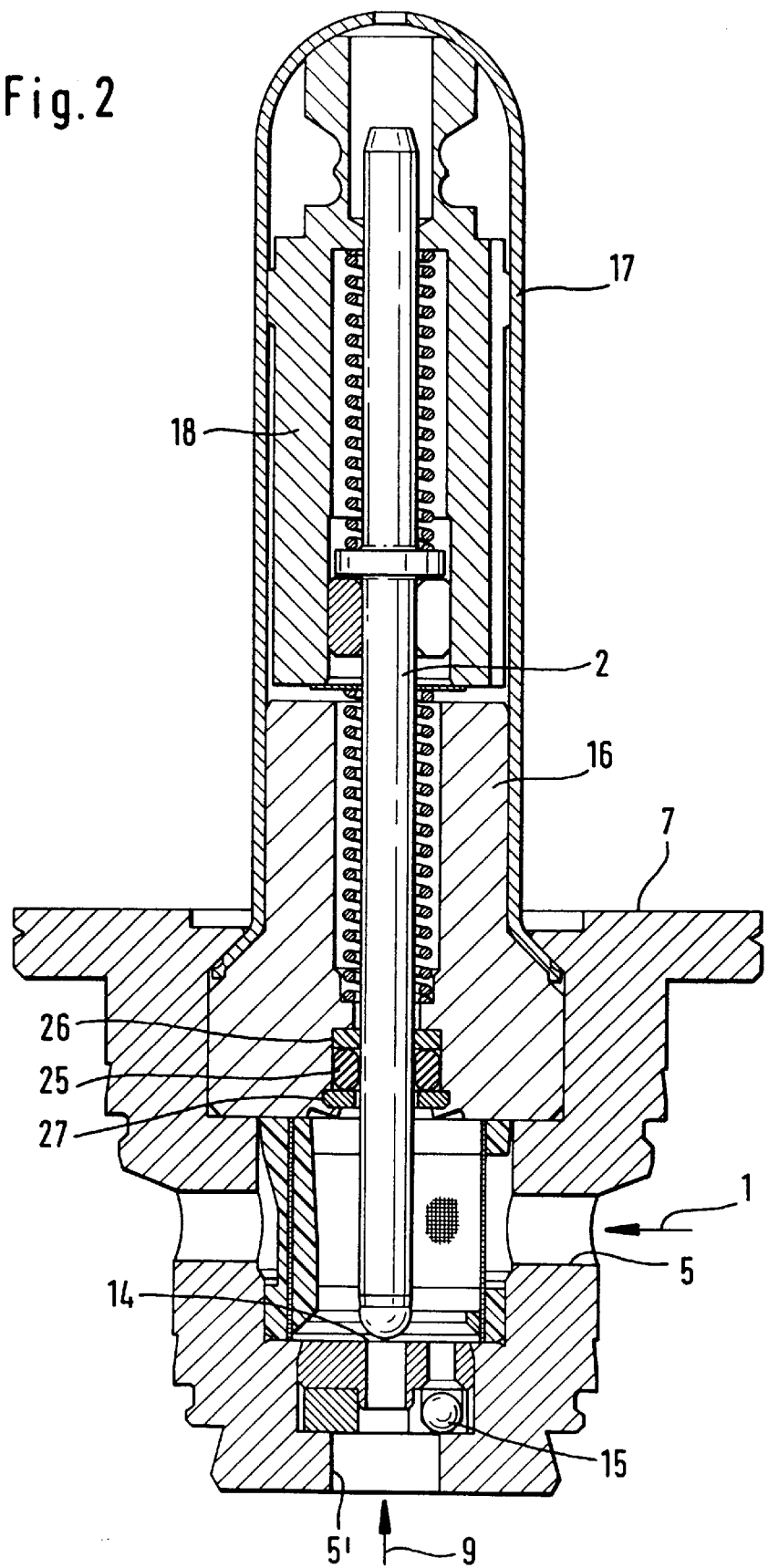
FIG. 2 shows an alternative embodiment.

An alternative embodiment can be seen in FIG. 2. Different from FIG. 1, the illustration of FIG. 2 includes a valve tappet 2 that is sealed in the magnetic core 16 so that, in the electromagnetically actuated closed position of the valve tappet 2, the pressure introduced by the braking pressure generator 1 into the first pressure fluid channel 5 cannot propagate until into the chamber of the valve sleeve 17. This prevents pressure variations of the braking pressure generator 1 from influencing the pressure-limiting function. When the solenoid valve is in its closed position, the pump pressure prevailing in the second pressure fluid channel 5' will mot move in the direction of the first pressure fluid channel 5 and, thus, to the braking pressure generator 1 until the hydraulic opening function of the valve tappet 2 is reached. Only with the exceeding of the preloading force of the pressure-limiting spring 20, which force acts between the valve tappet 2 and the magnetic armature 18, will the valve tappet 2 start moving from the valve seat 14 in the opening direction. Thus, all other details which are shown in FIG. 1 beneath the non-return valve 15 are removed from the design variation disclosed in FIG. 2. The valve tappet 2 is sealed in the magnetic core 16, preferably by an elastomeric seal 25 which is compressed as an annular seal between a prop ring 26 and a calked washer 27. The valve sleeve 17 has an atmospheric port in its dome area. With respect to low variations in compression, however, the atmospheric port may be removed in favor of an anti-corrosion magnetic armature chamber. Those details which are not dealt with in FIG. 2 can be taken from FIG. 1.

What is claimed is:

1. A solenoid valve with a pressure-limiting function, which includes a magnetic armature, enclosed by a valve sleeve, that fulfills a stroke movement in dependence on an energizable magnetic coil fitted to the valve sleeve, so that a valve tappet, which is arranged in the magnetic armature and is partially enclosed by a magnetic core, can cooperate with a valve seat mounted in a valve housing, and the stroke movement of the valve tappet guided with a clearance in the magnetic core, which movement can be performed as a function of the electromagnetic control force, is variable by the action of a hydraulic control force, including a first pressure fluid channel which opens into the valve housing proximate the valve tappet, and a second pressure fluid channel which opens into the valve housing remote from the valve seat and the valve tappet, the second pressure fluid channel being connectable to the first pressure fluid channel in dependence on the position of the tappet, wherein the hydraulic pressure of the first pressure fluid channel, opens into a pressure chamber of the valve housing into which the actuating member extends, wherein the hydraulic pressure of the first pressure fluid channel is applied to the actuating member which counteracts the closing movement of the valve tappet, the actuating member being acted upon by a compression spring in the pressure chamber which acts in the direction of the valve tappet, with the preloading force of the compression spring at the actuating member corresponding to the pressure force which is generated in the second pressure fluid channel and is effective in the direction of the compression spring, whereby the actuating member is sealed at its stem in the direction of the pressure chamber in the valve housing.

2. The solenoid valve as claimed in claim 1, wherein the actuating member is arranged coaxially relative to the valve tappet.

3. The solenoid valve as claimed in claim 1, wherein the actuating member includes at its stem an annular seal which prevents a bypass flow between the fluid of the first pressure fluid channel, that prevails in the pressure chamber, and the fluid of the second pressure fluid channel.

4. The solenoid valve as claimed in claim 3, wherein the annular seal is arranged proximate the valve housing and is acted upon by the pressure of the second pressure fluid channel.

5. The solenoid valve as claimed in claim 3, wherein the annular seal is fixed in position in the valve housing by a supporting disc on which a spring is supported.

6. The solenoid valve as claimed in claim 5, wherein a stem end of the actuating member, which is remote from the pressure chamber, is guided in a centering disc, and the spring is retained between the centering disc and the supporting disc.

7. The solenoid valve as claimed in claim 6, wherein a non-return valve is retained between the centering disc and the valve seat.

8. A hydraulic automotive vehicle brake system with automatic brake management, comprising a solenoid valve with a pressure-limiting function which includes a magnetic armature, enclosed by a valve sleeve, that fulfills a stroke movement in dependence on an energizable magnetic coil fitted to the valve sleeve, so that a valve tappet, which is arranged in the magnetic armature and is partially enclosed by a magnetic core, cooperates with a valve seat mounted in a valve housing, and the stroke movement of the valve tappet guided with a clearance in the magnetic core, which movement is performed as a function of the electromagnetic control force, is variable by the action of a hydraulic control force, including a first pressure fluid channel which opens into the valve housing proximate the valve tappet and establishes a connection to a braking pressure generator, and a second pressure fluid channel which opens into the valve housing remote from the valve seat and the valve tappet, the second pressure fluid channel being connected to a pump and at least one wheel brake and being connectable to the first pressure fluid channel in dependence on the position of the tappet, wherein the hydraulic pressure of the braking pressure generator, by way of a pressure fluid branch line at the first pressure fluid channel, opens into a pressure chamber of the valve housing into which the actuating member extends, wherein the hydraulic pressure of the braking pressure generator is applied to the actuating member which counteracts the closing movement of the valve tappet, the actuating member being acted upon by a compression spring in the pressure chamber which acts in the direction of the valve tappet, with the preloading force of the compression spring at the actuating member corresponding to the pressure force which is generated by the pump at the actuating member and is effective in the direction of the compression spring, whereby the actuating member is sealed at its stem in the direction of the pressure chamber in the valve housing.

9. The brake system as claimed in claim 8, wherein the actuating member is arranged coaxially relative to the valve tappet.

10. The brake system as claimed in claim 8, wherein the actuating member includes at its stem an annular seal which prevents a bypass flow between the fluid of the braking pressure generator, that prevails in the pressure chamber, and the fluid of the pump.

11. The brake system as claimed in claim 10, wherein the annular seal is arranged proximate the valve housing and is acted upon by the pressure of the pump.

12. The brake system as claimed in claim 10, wherein the annular seal is fixed in position in the valve housing by a supporting disc on which a spring is supported.

13. The brake system as claimed in claim 13, wherein a stem end of the actuating member, which is remote from the pressure chamber, is guided in a centering disc, and the spring is retained between the centering disc and the supporting disc.

14. The brake system as claimed in claim 13, wherein a non-return valve is retained between the centering disc and the valve seat.

* * * * *